US005329634A

United States Patent [19]
Thompson

[11] Patent Number: 5,329,634
[45] Date of Patent: Jul. 12, 1994

[54] COMPUTER SYSTEM WITH AUTOMATIC ADAPTER CARD SETUP

[75] Inventor: Stephen P. Thompson, Delray Beach, Fla.

[73] Assignee: International Business Machines Corp., Armonk, N.Y.

[21] Appl. No.: 801,215

[22] Filed: Dec. 2, 1991

[51] Int. Cl.$^5$ .................... G06F 13/00; G06F 13/376
[52] U.S. Cl. ............................ 395/500; 364/DIG. 1; 364/238; 364/238.2; 364/240; 364/252.3; 364/254; 364/254.4; 364/DIG. 2; 364/929.4; 364/929.5
[58] Field of Search .................. 395/DIG. 1 MS File, 395/DIG. 2 MS File, 404, 425, 200, 250, 275, 500, 775, 800; 341/159

[56] References Cited
U.S. PATENT DOCUMENTS 4,964,038 10/1990 Louis et al. .................. 364/DIG. 1
5,038,320 8/1991 Heath et al. .................. 364/DIG. 1

Primary Examiner—Robert B. Harrell
Attorney, Agent, or Firm—Martin J. McKinley

[57] ABSTRACT

A computer adapter card (204) includes a plurality of setup registers (224-226) for receiving setup parameters during initialization of the computer system. Each of the setup registers of an adapter card is accessed at the same address as the corresponding setup register of all other adapter cards in the system. The adapter card is designed to be connected to a computer bus (201) that does not include individual setup lines for each of the adapter cards in the system. To select an individual adapter card, each adapter card includes a register (214) for storing a programmable adapter card number, a plurality of switches (218) for selecting a switch selectable adapter card number, and a comparator (216) for comparing the programmable adapter card number to the switch selectable adapter card number. When an adapter card is initially installed in the computer system, the user sets the switches to correspond to the number of the adapter card slot into which the card is inserted. Thus, the switches of each adapter card in the system are set to a unique switch seleted number. When the comparator detects a match between the programmable and switch selectable adapter card numbers, and when the adapter card is placed in the setup mode, the setup registers (224-226) of the selected adapter card are enabled, such that the computer system can write setup parameters to, and read setup parameters from the setup registers of the selected adapter card.

9 Claims, 1 Drawing Sheet

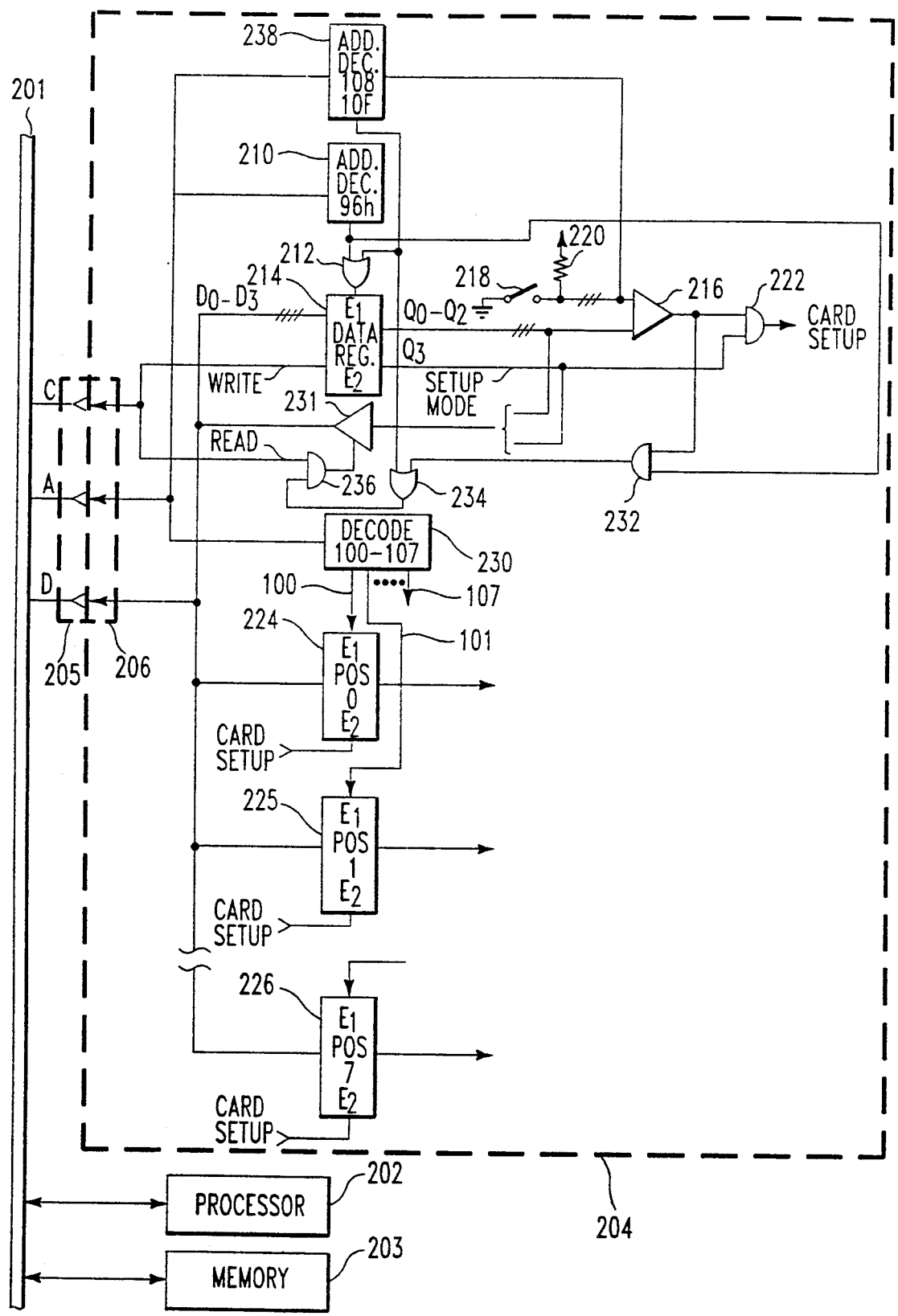

COMPUTER SYSTEM WITH AUTOMATIC ADAPTER CARD SETUP

BACKGROUND OF THE INVENTION

This invention pertains to computer systems and, more particularly, to a computer system capable of accepting one or more adapter cards in which each adapter card has one or more setup registers that are addressable at the same address as corresponding setup registers of other adapter cards.

The use of adapter cards is a well known technique for expanding the capability of a computer system. For example, if a computer user needs the capability to send and receive data, an adapter card specifically designed for modem communications can be inserted into the computer to provide, in conjunction with appropriate communications software, the required data communications capability.

Generally, personal computers are equipped with a plurality of "slots" into which adapter cards can be inserted. The essential element of each slot is a connector that is connected to an address and data bus within the computer. The adapter card includes a mating connector, usually a printed circuit board edge connector, that can be inserted into one of the computer's adapter card connectors, i.e., one of the computer's slots.

To prevent interference with other adapter cards that may already be in the system, as well as interference with various resources within the computer, each adapter card must be provided with certain "setup" parameters, such as the specification of the port address through which the card communicates over the bus. In the IBM AT TM computer (the bus architecture of which has come to be known as the ISA or Industry Standard Architecture) setup parameters are specified by the setting of switches, such as dual-in-line or "DIP" switches, or the use of jumpers that are located on the adapter card. The difficulty in establishing setup parameters through the use of switches and jumpers is that the user must carefully choose, usually after reading the instruction manual for each adapter card in the computer, the setup parameters for each card to ensure that one adapter card does not interfere with another.

To overcome this drawback, the IBM Micro Channel TM architecture uses a system in which each adapter card includes a plurality of programmable setup registers, called Programmable Option Select or "POS" registers. The particular setup parameters are determined automatically by a setup program that is supplied with each Micro Channel computer, which in turn uses information that is provided on a reference diskette that is supplied with each of the adapter cards. These setup parameters are programmed into the POS registers of each of the adapter cards, usually immediately after power on and during system initialization.

In a conventional Micro Channel adapter card, there are eight POS registers, POS0-POS7, some of which may be read only registers. Each POS register of each adapter card is addressed at the same address as the corresponding POS register of every other adapter card. More specifically, in the Micro Channel architecture, POS registers 0-7 are addressed at I/O addresses 100-107 (hex) respectively. To read from or write to the POS registers of a particular adapter card, the Micro Channel bus includes a separate setup line for each adapter card slot in the system. Thus, to setup the adapter card that is physically located in the first slot of the computer, the system is placed in the setup mode and the first setup line is activated (while all other setup lines remain in the inactive state). After properly selecting a particular adapter card, the processor can then individually address each one of the POS registers of the currently selected card. For a more detailed explanation of the POS registers of the Micro Channel architecture, the reader is referred to U.S. Pat. No. 5,038,320.

It would be desirable if the Micro Channel architecture's automatic setup procedure could be used in an ISA bus computer. However, current adapter cards for ISA bus computers do not include setup or POS registers, and if they did, the ISA bus does not include separate setup lines for each card slot. Accordingly, the invention described below includes an adapter card for an ISA bus computer (or other bus that does not include separate setup lines for each adapter card) that has setup or POS registers. These setup registers are addressed in a manner similar to the POS registers of a Micro Channel adapter card, that is, the address of each setup register of each adapter card is identical to the address of the corresponding setup register of every other adapter card. More importantly, this invention also includes a means for addressing the setup registers of each individual adapter card, despite the fact that the setup registers of each adapter card share common addresses, and despite the fact that the bus does not include separate setup lines for each adapter card.

BRIEF DESCRIPTION OF THE DRAWINGS

FIG. 1 is a schematic diagram of a computer system including an adapter card of the present invention

SUMMARY OF THE INVENTION

Briefly, the invention is a computer adapter card including a bus connecting means for electrically connecting the adapter card to a computer bus. A first data register stores a programmable adapter card number that is received from the bus connecting means. A first address decoder decodes a first address that is received from the bus connecting means and, in response to a decode of the first address, provides a first enable signal to the first data register. Switch means, which is manually selectable by a user, is provided for selecting a switch selected adapter card number. A second data register stores setup data received from the bus connecting means, and a second address decoder provides a second enable signal to the second data register in response to a decode of a second address. A comparator is provided for comparing the programmable adapter card number stored in the first data register with the switch selected adapter card number. When a match is detected between the programmable adapter card number in the first data register and the switch selected adapter card number, the comparator provides a third enable signal to the second data register. Thus, the invention operates such that access to the second data register is provided by setting the switch means to the switch selected adapter card number, loading the switch selected adapter card number into the first data register, and then addressing the second data register at the second address.

In another embodiment, the invention is a computer system having a bus that includes an adapter card receiving means. A processor is provided for providing address and data information to the bus, and a memory stores a program for execution by the processor. In addition, the computer system includes the adapter card described in the preceding paragraph.

DESCRIPTION OF THE PREFERRED EMBODIMENT

FIG. 1 is a schematic diagram of a computer system that includes the present invention. Referring to this figure, the computer system includes a Bus 201, a Processor 202, a Memory 203 and an Adapter Card 204. Bus 201 is a conventional ISA bus (or other bus that does not include separate setup lines for each adapter card) and includes individual control, address and data lines. Bus 201 also includes a plurality of receptacles 205 (only one is illustrated in FIG. 1) for receiving adapter cards, such as Adapter Card 204. Each location at which an adapter card can be inserted into the system is referred to as a "slot" and each slot includes one receptacle 205. Each slot is assigned a unique slot or adapter card number. Although the slot numbers may be arbitrarily assigned, they usually correspond to the physical location of the slot. Memory 203 stores one or more programs for execution by Processor 202. In FIG. 1, Memory 203 and Processor 202 communicate via Bus 201, although, in an ISA bus, a separate memory bus interconnects the Memory and the Processor. The Processor 202 provides control, address and data information to Bus 201.

Adapter Card 204 is electrically connected to Bus 201 via connector 206, which is inserted into one of the receptacles 205. Address decoder 210 is connected to the address lines of Bus 201 and decodes I/O address port 96$h$ (the suffix "h" is used to indicate that the preceding number is expressed in hexadecimal format). The output of decoder 210 is coupled to an OR Gate 212 and the output of the OR Gate is coupled to a First Enable input ($E_1$) of a Data Register 214. A Second Enable ($E_2$) input of Data Register 214 is coupled to the Write line of Bus 201. Both the First and Second Enable inputs must be active in order to write data to Data Register 214. Data register 214 has four data inputs that are connected to the data lines of Bus 201. Three of the four data inputs ($D_0$–$D_2$) to Data Register 214 are used to write a programmable slot number into the Data Register, while the fourth ($D_3$) is used to indicate when the system is in the setup mode of operation.

To write to Data Register 214, the Processor 202 places address 96$h$ on the Bus 201, which is decoded by Address Decoder 210. The output of Address Decoder 210 then enables input $E_1$ to Data Register 214. During a write operation, the Write Line of the control portion of Bus 201 is pulled active, thereby activating input $E_2$ of Data Register 214. With both Enable inputs active, data bits $D_0$–$D_3$ are then written into Data Register 214.

Each of the three outputs $Q_0$–$Q_2$ (the outputs that indicate the programmable slot number) of Data Register 214 are coupled to a first input of one of three Comparators 216 (only one comparator is illustrated in FIG. 1). Likewise, each of three Switches 218 (only one switch is illustrated in FIG. 1) is coupled to a second input of one of the Comparators 216. Each of the second inputs to the Comparators includes a Pull-up Resistor 220. The Switches 218 are used to select a switch selectable slot number. The Switches 218 are manually selectable by a user and are preferably contained in a small, eight position rotary switch suitable for direct mounting on a printed circuit board, although other manually selectable switches may also be suitable. In the alternative, jumpers may be used in place of the Switches 218. The three outputs of Comparators 216 are connected to one of three inputs of a four input AND Gate 222 (only two inputs of AND Gate 222 are illustrated in FIG. 1). The fourth input to AND Gate 222 is connected to the $Q_3$ output (the output that indicates setup mode) of Data Register 214.

After (or immediately before) inserting Adapter Card 204 into Receptacle 205, the user sets the Switches 218 to indicate the particular slot number that the Adapter Card has been plugged into (the switch selectable slot number). If the programmable slot number, as loaded into bits $Q_0$–$Q_2$ of Data Register 214, matches the switch selectable slot number, as selected by Switches 218, the outputs of Comparators 216 are active. And, if $Q_3$ (the setup mode bit of Data Register 214) is also active, then the output (Card Setup) of AND Gate 222 is active, indicating that Adapter Card 204 is in the setup mode. (Note that, if the switches of each of the adapter cards in the system are set to unique slot numbers, then only one of the adapter cards can be placed in the setup mode at any one time.)

The output of AND gate 222 (Card Setup) is coupled to the Second Enable ($E_2$) input of each of eight data registers POS0–POS7 (only three such data registers 224, 225, and 226 are illustrated in FIG. 1). These data or "setup" registers, which are referred to as Program Option Select or "POS" registers, are used to store setup information pertinent to this particular adapter card. These setup registers correspond to the POS registers in the Micro Channel bus version of the computer.

To individually address each one of the POS registers, Address Decoder 230 decodes addresses 100$h$ through 107$h$, and a decode of each address within this range causes a First Enable ($E_1$) input of a corresponding POS register to be enabled. For example, when address 100$h$ is decoded, input $E_1$ of the POS0 register (224) is activated. Similarly, when address 101$h$ is decoded, input $E_1$ of the POS1 register (225) is enabled. However, before any one of the POS registers can be accessed, the adapter card must be placed in the setup mode, such that Card Setup activates the Second Enable ($E_2$) inputs of the POS registers.

To setup an adapter card, the processor must write setup parameters to, and read setup parameters from the POS registers. The processor does this under the control of a setup program stored in the Memory 203, which is usually run at system initialization. Since the setup program is well known in the Micro Channel computer art, the details of the program are not presented here.

To write parameters to and read parameters from the POS registers, the Processor 202 begins by placing address 96$h$ on the bus, thereby selecting Address Decoder 210. The processor then selects a particular adapter card slot by writing a "programmable card slot number" into Data Register 214. Simultaneously with the writing of the programmable card slot number, the processor also sets the third bit ($Q_3$) of Data Register 214 active to indicate that the system is now operating in the setup mode. If the system is in the setup mode, and if the programmable card slot number, as stored in Data Register 214, matches the switch selectable card number, as determined by the setting of the switches 218, each one of the POS registers on the currently selected adapter card may now be individually accessed. To access a particular POS register, the Processor places the corresponding address of the POS register (100h for POS0, 101h for POS1, etc.) on the Bus, and Address Decoder 230 then enables the selected POS register through its $E_1$ input.

Primarily for testing purposes, it is also possible to read the contents of Data Register 214. To permit the reading of the contents of Data Register 214, the output of a four line Bus Transceiver 231 is coupled to the data portion of Bus 201, and the $Q_0$ through $Q_3$ outputs of Data Register 214 are coupled to the inputs of this Bus Transceiver. The output of Comparator 216 and the output of Address Decoder 210 are coupled to the input of a two input AND Gate 232. The output of AND gate 232 is coupled to one input of an OR Gate 234, the output of which is coupled to one input of a two input AND Gate 236. The other input of AND Gate 236 is coupled to the Read Line of the control portion of Bus 201. The output of AND Gate 236 is coupled to the enable input of Transceiver 231. Consequently, when the card is in the setup mode, the output of comparator 216 and the first input of AND Gate 232 are active. The second input of AND Gate 232 is active when Address Decoder 210 is selected by placing address 96h on the Bus. Under both of these conditions, the output of AND Gate 232 is active and this signal is passed through OR Gate 234 and into the first input of AND Gate 236. When the control portion of Bus 201 indicates that the Bus is in read mode by pulling the Read active, the other input of AND Gate 236 also goes active. Since both inputs of AND Gate 236 are now active, its output goes active, thereby enabling Transceiver 231 and gating the contents of Data Register 214 onto the Bus.

There is an additional method of reading the contents of Data Register 214. To accomplish this, Address Decoder 238 has three inputs that are coupled to the output of Switches 218, thereby presenting the switch programmable card number to Address Decoder 238. The other input to Address Decoder 238 is coupled to the address lines of Bus 201, such that the Address Decoder decodes an address within the range of 108h–10Fh. The particular address within that range that is decoded depends upon the three inputs from Switches 218. Consequently, when Switches 218 are set to Card Number 0, the output of Address Decoder 238 goes active only when address 108h is placed on the Bus. Similarly, when the Switches are set to Card Number 1, the output of the Address Decoder goes active only when address 109h is placed on the Bus. This output from Address Decoder 238 is coupled to the second input of OR Gate 234, thereby enabling Bus Transceiver 231 when the read line of Bus 201 is active.

The output of Address Decoder 238 is also coupled to the second input of OR Gate 212, thereby enabling the first Enable Input $E_1$ of Data Register 214 when an address in the range of 108h–10Fh is decoded, and when that address corresponds to the switch programmable card number set by Switches 218. Thus, by addressing the card in this way, a second method is provided for writing data into Data Register 214.

Other embodiments are within the scope of the following claims.

I claim as my invention:

1. A computer adapter card, comprising in combination:
   bus connecting means for electrically connecting said adapter card to a computer bus;
   a first data register for storing a programmable adapter card number received from said bus connecting means;
   a first address decoder for decoding a first address received from said bus connecting means, said first address decoder providing a first enable signal to said first data register in response to a decode of said first address;
   switch means for selecting a switch selected adapter card number;
   a second data register for storing setup data received from said bus connecting means;
   a second address decoder for decoding a second address received from said bus connecting means, said second address decoder providing a second enable signal to said second data register in response to a decode of said second address; and
   a comparator for comparing said programmable adapter card number stored in said first data register with said switch selected adapter card number, said comparator providing a third enable signal to said second data register in response to a match between said programmable adapter card number in said first data register and said switch selected adapter card number;
   such that access to said second data register is provided by setting said switch means to said switch selected adapter card number, loading said switch selected adapter card number into said first data register, and addressing said second data register at said second address.

2. The computer adapter card of claim 1, wherein said adapter card is operable in a normal mode and a setup mode, said adapter card further comprising:
   a third register for storing a mode indicator received from said bus connecting means, said adapter card being in said normal mode in response to said mode indicator being in an inactive state, and said adapter card being in said setup mode in response to said mode indicator being in an active state;
   logic means for inhibiting said third enable signal in response to said mode indicator being in the inactive state.

3. The computer adapter card of claim 2, further comprising:
   a third address decoder for decoding a range of addresses received from said bus connecting means, each address within said range of addresses corresponding to a unique adapter card number, said third address decoder having an input coupled to said switch means, said third address decoder outputting a fourth enable signal to said first data register in response to an address received from said bus connecting means that corresponds to said switch selected adapter card number.

4. The computer adapter card of claim 1, further comprising:
   a third address decoder for decoding a range of addresses received from said bus connecting means, each address within said range of addresses corresponding to a unique adapter card number, said third address decoder having an input coupled to said switch means, said third address decoder outputting a fourth enable signal to said first data register in response to an address received from said bus connecting means that corresponds to said switch selected adapter card number.

5. A computer system, comprising in combination:
   a bus including adapter card receiving means;
   a processor for providing address and data information to said bus;

a memory for storing a program for execution by said processor;

an adapter card including:

bus connecting means for electrically connecting said adapter card to said receiving means of said bus;

a first data register for storing a programmable adapter card number received from said bus connecting means;

a first address decoder for decoding a first address received from said bus connecting means, said first address decoder providing a first enable signal to said first data register in response to a decode of said first address;

switch means for selecting a switch selected adapter card number;

a second data register for storing setup data received from said bus connecting means;

a second address decoder for decoding a second address received from said bus connecting means, said second address decoder providing a second enable signal to said second data register in response to a decode of said second address; and a comparator for comparing said programmable adapter card number-stored in said first data register with said switch selected adapter card number, said comparator providing a third enable signal to said second data register in response to a match between said programmable adapter card number in said first data register and said switch selected adapter card number;

such that access to said second data register is provided by setting said switch means to said switch selected adapter card number, loading said switch selected adapter card number into said first data register, and addressing said second data register at said second address.

6. The computer system of claim 5, wherein said adapter card is operable in a normal mode and a setup mode, said adapter card further comprising:

a third register for storing a mode indicator received from said bus connecting means, said adapter card being in said normal mode in response to said mode indicator being in an inactive state, and said adapter card being in said setup mode in response to said mode indicator being in an active state;

logic means for inhibiting said third enable signal in response to said mode indicator being in the inactive state.

7. The computer system of claim 6, wherein said adapter card further comprising:

a third address decoder for decoding a range of addresses received from said bus connecting means, each address within said range of addresses corresponding to a unique adapter card number, said third address decoder having an input coupled to said switch means, said third address decoder outputting a fourth enable signal to said first data register in response to an address received from said bus connecting means that corresponds to said switch selected adapter card number.

8. The computer system of claim 5, wherein said adapter card further comprising:

a third address decoder for decoding a range of addresses received from said bus connecting means, each address within said range of addresses corresponding to a unique adapter card number, said third address decoder having an input coupled to said switch means, said third address decoder outputting a fourth enable signal to said first data register in response to an address received from said bus connecting means that corresponds to said switch selected adapter card number.

9. A computer adapter card, comprising in combination:

bus connecting means for electrically connecting said adapter card to a computer bus:

register means for storing a programmable adapter card number received from Said bus connecting means;

switch means for selecting a switch selected adapter card number;

setup means for storing setup data, said setup means being capable of being enabled and disabled;

comparator means for comparing said programmable adapter card number to said switch selected adapter card number and for enabling said setup means in response to a match between said programmable adapter card number and said switch selected adapter card number.

* * * * *